US006786350B2

United States Patent
Bauer

(10) Patent No.: US 6,786,350 B2
(45) Date of Patent: Sep. 7, 2004

(54) FUEL CONTAINER WITH ATTENTUATION ELEMENT

(75) Inventor: Wolfgang Bauer, Soding (AT)

(73) Assignee: Tesma Motoren und Getriebetechnik GmbH, Preding (AT)

( * ) Notice: Subject to any disclaimer, the term of this patent is extended or adjusted under 35 U.S.C. 154(b) by 0 days.

(21) Appl. No.: 10/194,141

(22) Filed: Jul. 12, 2002

(65) Prior Publication Data

US 2003/0038136 A1 Feb. 27, 2003

Related U.S. Application Data

(62) Division of application No. 09/770,908, filed on Jan. 26, 2001, now abandoned.

(30) Foreign Application Priority Data

Jan. 26, 2000 (AT) .......................................... 42/2000 U

(51) Int. Cl.[7] .............................................. B65D 88/12
(52) U.S. Cl. ...................................................... 220/563
(58) Field of Search ................................ 220/563, 564, 220/4.34; 244/135 R

(56) References Cited

U.S. PATENT DOCUMENTS

| 3,508,578 A | | 4/1970 | Stephens et al. |
| 3,746,178 A | | 7/1973 | Wagschal |
| 4,758,196 A | | 7/1988 | Wang |
| 4,844,278 A | * | 7/1989 | Freiwald et al. ............ 220/563 |
| 5,054,635 A | * | 10/1991 | Kolom ...................... 220/4.15 |
| 5,711,107 A | | 1/1998 | Louisiana |
| 5,904,606 A | | 5/1999 | Zimmer et al. |
| 6,283,412 B1 | * | 9/2001 | Mango ................... 244/135 R |

FOREIGN PATENT DOCUMENTS

DE 19650415 A * 6/1998

* cited by examiner

Primary Examiner—Stephen Castellano
(74) Attorney, Agent, or Firm—Clark Hill PLC

(57) ABSTRACT

A fuel tank for motor vehicles is constructed so that the generation of noise in the fuel tank due to sloshing fuel is minimized. For this purpose, a dampener element, which is permeable to the flow of liquid fuel, is attached to the interior of the tank. According to the invention, the dampening element has a dimensionally stable lattice or similar network structure. This dampener element is attached near the bottom wall of the fuel tank and has a generally horizontal orientation.

3 Claims, 3 Drawing Sheets

FUEL CONTAINER WITH ATTENTUATION ELEMENT

This application is a divisional of Ser. No. 09/770,908 filed Jan. 26, 2001, now abandoned.

BACKGROUND OF THE INVENTION

This invention relates to a dampener element that is permeable to fluid flow. In particular, this invention relates to a dampener permeable to fluid flow placed in a fluid tank of a motor vehicle.

Sloshing noises that originate inside a fluid tank of a motor vehicle, such as a fuel tank, can be perceived as annoying. These noises are due to the movement of liquid fuel during driving. Dampener or baffle elements used to prevent or reduce sloshing noises in the fuel tank are known in various designs. From German patent specification DE 196 50 415 C2, it is known to locate inside a fuel tank dampener elements that float on the fuel surface. These dampener elements have a freely floating element whose surface is equipped with a material, for instance knitted fabric that has open pores. Several such elements may be freely floating in the fuel tank, and are not necessarily connected to each other. These dampener elements obstruct waves and currents in the tank and act directly as noise dampeners.

Different embodiments of plate-shaped and tubular baffle elements are known from German patent specification DE 39 05 611 C2 and its foreign equivalent, U.S. Pat. No. 4,974,743. Baffle elements are particularly located at the interior walls of the fuel tank and are intended to cause a reduction of the energy of the impinging fuel waves and thereby reduce impact noise. One embodiment of the baffle element consists of a corrugated plastic sheet molded with numerous slits which, when expanded, form meshes that serve as voids to entrap air. The entrapped air effectively dissipates the energy of the waves, so that the impact force of the fuel contacting the tank walls is dramatically decreased, thus suppressing the noise level. In another embodiment, the baffle is formed from a bent sheet with one side having a large number of plastic needles, similar to a brush, with the needles facing the fuel flow. Yet another embodiment in this specification discloses a baffle consisting of a sheet made from a large number of synthetic resin or plastic fibers that are mixed and entangled with one another, forming numerous energy dissipating voids.

A further variation of a dampener element is known from U.S. Pat. No. 4,844,278. In this disclosure, the interior walls of the fuel tank are equipped with a three-dimensional structured plastic insert whose structure forms small calming chambers. The wave fronts of the sloshing fuel impact the fuel-free regions of the tank insert and are dissolved by the calming chambers into a plurality of wave sections over a large area. Guide fins are further provided to divert the wave fronts and improve the dampening effect by increasing the length of the flow paths.

Furthermore, it is also known that, when the fuel level in the tank drops, not only does the amplitude of the waves causing the sloshing noise increase, but the resonance volume in the fuel tank also increases, which causes the sloshing noise to become particularly loud. Baffles which are attached as impact elements at interior walls would have to cover nearly the entire fuel tank surface in order to be effective everywhere. This approach is cumbersome, work-intensive and expensive. Floating dampener elements, as known from the afore-mentioned DE 196 50 416 C2, have a less complicated design and can be accommodated in fuel tanks with varying shapes if necessary. However, they also require a relatively large amount of space to be effective, which unnecessarily restricts the filling capacity of the fuel tank.

An object of the present invention is to provide dampener elements which largely prevent potential waves of liquid fuel from forming, have a simple and robust design, can be manufactured cost-effectively, and can be accommodated simply, while not restricting the filling capacity of the fuel tank. A further object is to provide a fuel tank equipped with said dampener elements that has a very low noise level.

Other objects and advantages of the present invention will become apparent from the following detailed description of the invention when considered in conjunction with the accompanying drawings.

SUMMARY OF THE INVENTION

According to the present invention, there is provided a dampener assembly including a dampener element that has the form of a lattice, mesh, or similar network. The dampener assembly is meant to be attached with a horizontal orientation inside a fluid tank of a motor vehicle, such as a fuel tank or the like. Preferably the dampener assembly is attached adjacent a bottom portion of the tank.

A dampener assembly according to this invention that has been placed inside a liquid fuel tank is particularly effective in preventing the creation and propagation of large-volume waves, particularly during acceleration or deceleration of the vehicle, as well as, in the case of a depleting fuel volume, which can create sloshing noises at the interior walls of the fuel tank. In particular, this dampening can be attributed to the lattice or mesh design. Further, this design is very simple and can be produced easily. Since the dampener is located relatively close to the bottom of the fuel tank, the filling quantity of the tank is not restricted, unlike some prior art approaches. Since waves in liquids are not a superficial occurrence but reach deep into the liquid, the motion-restricting device, which is located near the bottom of the fuel tank, causes an obstruction during the origin of the wave and a quick dampening of possible fuel movement, even when the level of the fuel is higher.

The dampener element is preferably formed of a material that provides dimensional stability. The dampener element includes a plurality of adjoining base elements. The base elements include connection bars that converge at junction points. Preferably, each base element forms a polygon. The dampener element can be formed from plastic, in particularly by injection molding.

In a preferred embodiment, the base elements each have the same shape. Still more preferably, each base element is square shaped. Such a consistently designed dampener assembly is able to effectively dampen fluid movement in the tank in all possible directions.

Because the dampener assembly is subject to frequent loading and unloading of fluid forces, it is preferable for durability reasons that the dampener assembly be resilient. In particular, it is desirable that the dampener assembly is designed having an elastic deformation limit greater than the fluid forces to which it is subjected. A preferred embodiment of a dampener assembly having a resilient structure includes a dampener element having connection bars that are joined by junction points that are hollow, such as a such as a ring, sleeve or the like.

In a preferred embodiment, the dampener assembly can be attached in a simple and durable manner inside the fuel tank by having at least one of the junction points include a hollow sleeve that is adapted to slide about and into locking engagement with a stud that extends from an interior portion of the fluid tank.

This locking function can be facilitated in a simple, practical and durable manner, for example, by providing a locking wedge on one of the sleeve and the stud, and a corresponding locking groove on the other of the sleeve and stud.

The dampening effect of the dampener assembly may be improved by attaching and stacking two or more dampener elements on top of each other. To increase the stability of the stacked dampener elements, junction points of each of the dampener elements may be designed as connector sockets, which connect the dampener elements together.

It should be appreciated that other methods of attaching the dampener assembly inside a fluid tank, as well as, other methods of attaching multiple dampener elements together may be considered. A simple alternative uses clips to connect the dampener elements to each other or to a fluid tank.

DETAILED DESCRIPTION OF THE INVENTION

Figure 1:
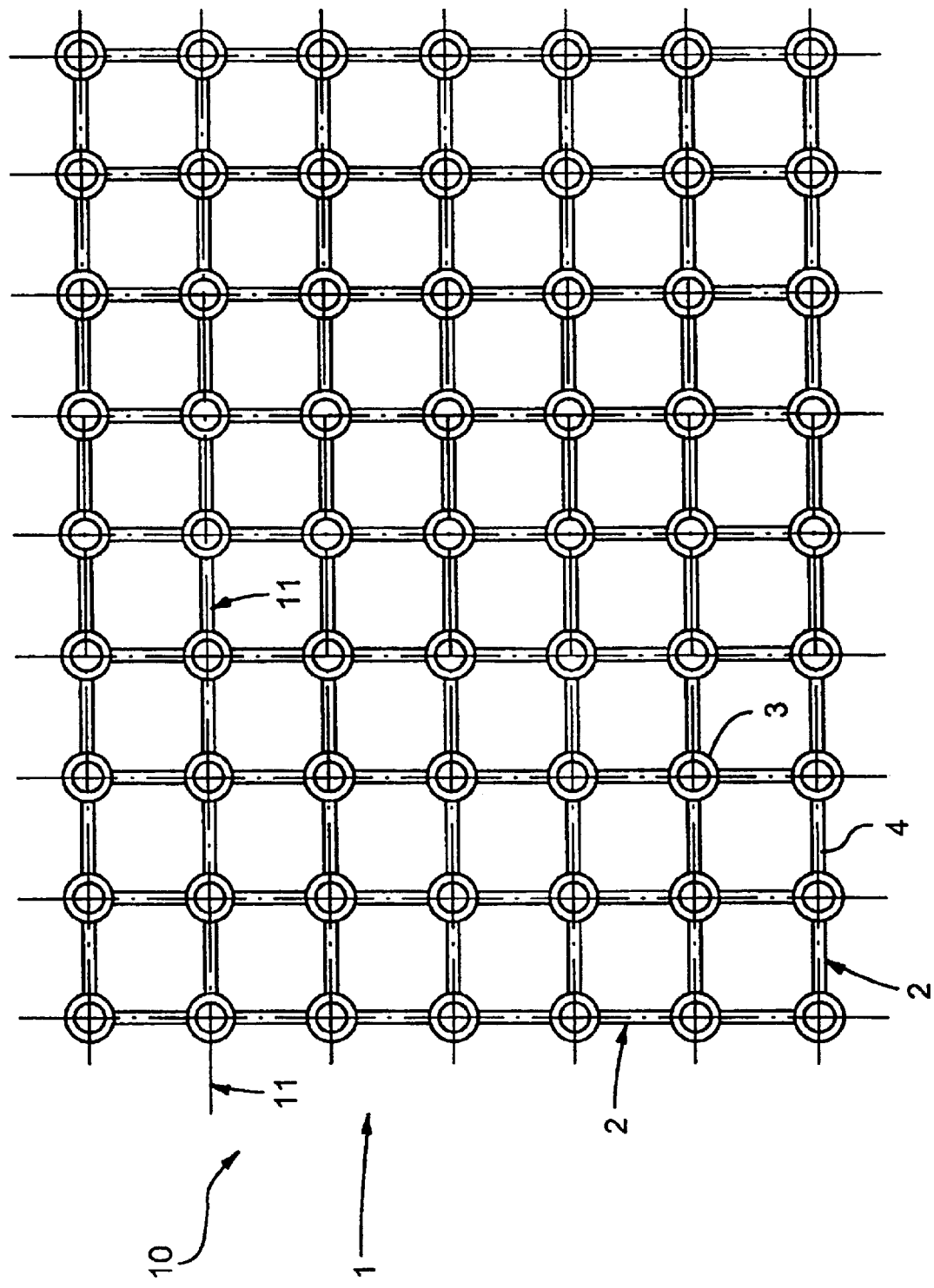
FIG. 1 shows a top view of a dampener assembly according to this invention.

A dampener assembly according to this invention is shown generally at 10 in FIG. 1. The dampener assembly includes a dampener element 1 having a lattice, mesh or like network structure. The dampener element 1 includes a plurality of adjoining base elements 2. Each base element 2 includes connection bars or shafts 4 having opposite ends that terminate at junction or connection points 3. Adjoining base elements 2 are connected to each other by respective connection bars 4, which extend from a common connection point 3. The base elements 2 are illustrated in FIG. 1 as having four connection bars 4 that are substantially straight members of substantially equal length so as to form adjoining squares. Alternatively, the base elements 2 may include any number and any shape of connection bars provided that the base elements 2 form a closed cellular structure. Preferably, the base elements 2 include three or more substantially straight connection bars 4 so as to form a polygon. Alternatively, the base elements 2 may include two or more curvilinear connection bars (not shown) so as to form a closed figure that is either planar or non-planar.

The connection bars 4 preferably have circular or elliptical cross-sections. Alternatively, the connection bars 4 may have cross-sections of any suitable shape including rectangular, triangular, irregular and the like.

Figure 2:
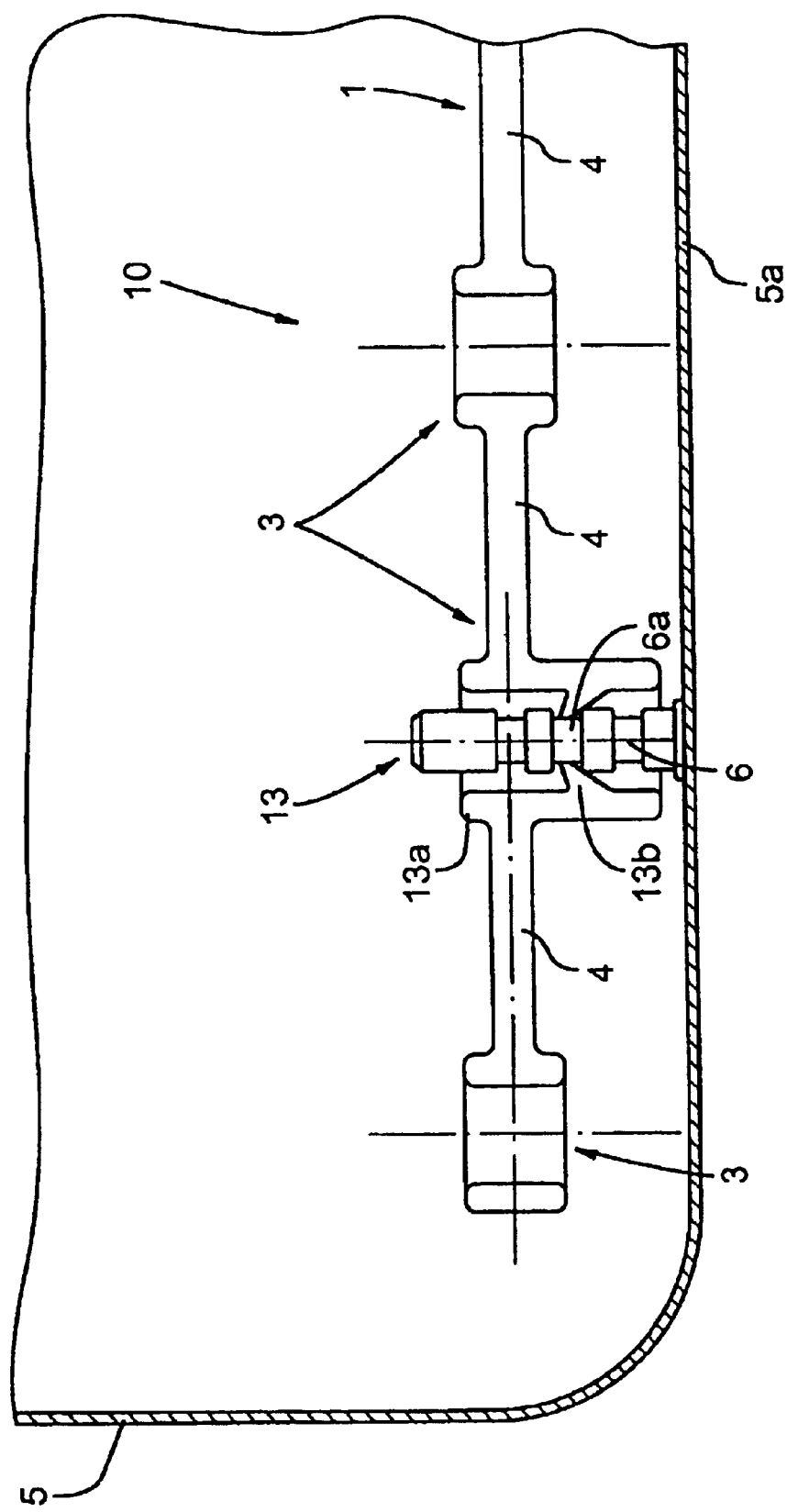
FIG. 2 shows a partial section along line II—II shown in FIG. 1.

The junction points 3 have an annular design with an aperture formed in a central portion. The height of the junction points 3 is preferably greater than the cross-sectional height of the connection bars 4. It should be appreciated that while the height of the junction points 3 is shown in FIG. 2 to be approximately twice the height of the connection bars 4, the height of the connection joints 3 may be equal to, greater than, or less than the height of the connection bars 4.

Preferably, one or more the junction points 3 of dampener element 1 are intended to attach the dampener element 1 to a bottom wall 5a of a fluid tank 5 for a motor vehicle (not shown), such as a fuel tank. These junction points or tank connectors are indicated generally at 13 in FIG. 2. The number of tank connectors 13 that are required to reliably attach the dampener element 1 to the inside the tank 5 for a given application is predetermined. The tank connectors 13 form rings or sleeves 13a that have a greater axial dimension than the axial dimension of the rings formed by the junction points 3 previously discussed that are not attached directly to the tank 5. Preferably, an annular locking wedge 13b extends from an inner surface or wall of each sleeve 13a, the purpose of which is made clear below.

The bottom wall 5a of the tank 5 has attachment studs or bolts 6 that protrude into the interior of the tank 5. Each attachment stud 6 has a locking groove 6a formed in an outer surface of the stud 6. The location of the attachment studs 6 on the bottom wall 5a of the tank 5 corresponds to the location of tank connectors 13 of the dampener element 1. Attachment of dampener element 1 to the tank 5 is accomplished by pushing each of the tank connectors 13 onto the corresponding attachment stud 6 so that the locking wedges 13b are disposed in the corresponding locking grooves 6a. Preferably, the locking wedges 13b protrude slightly upwards inside the sleeves 13a, as shown in FIG. 2, so that elastic deformation of locking wedges 13b takes place when the tank connectors 13 are properly positioned about the attachment studs 6. Interlocking between the tank connectors 13 and the studs 6 may be achieved by a suitable alternative manner, such as by forming locking wedges (not shown) on the stud 6 and complementary locking grooves (not shown) in the sleeves 13.

It should be appreciated that a dampener element (not shown) similar in construction to the dampener element 1 may be attached to a stud similar to the stud 6 by a tank connector similar to the tank connector 13. Specifically, one or more tank connectors may extend from predetermined connection bars between corresponding junction points toward the bottom of a tank. In this arrangement, the modified tank connectors include only the portion of the sleeve 13 that extends below the connection bars 4 of the dampener element 1, that is, the modified tank connectors are only open at one end. Also, in this arrangement the stud 6 is modified so as not to extend through the dampener element, rather the modified stud would necessarily terminate at or below the lowest point of the corresponding connection bar.

Figure 3:
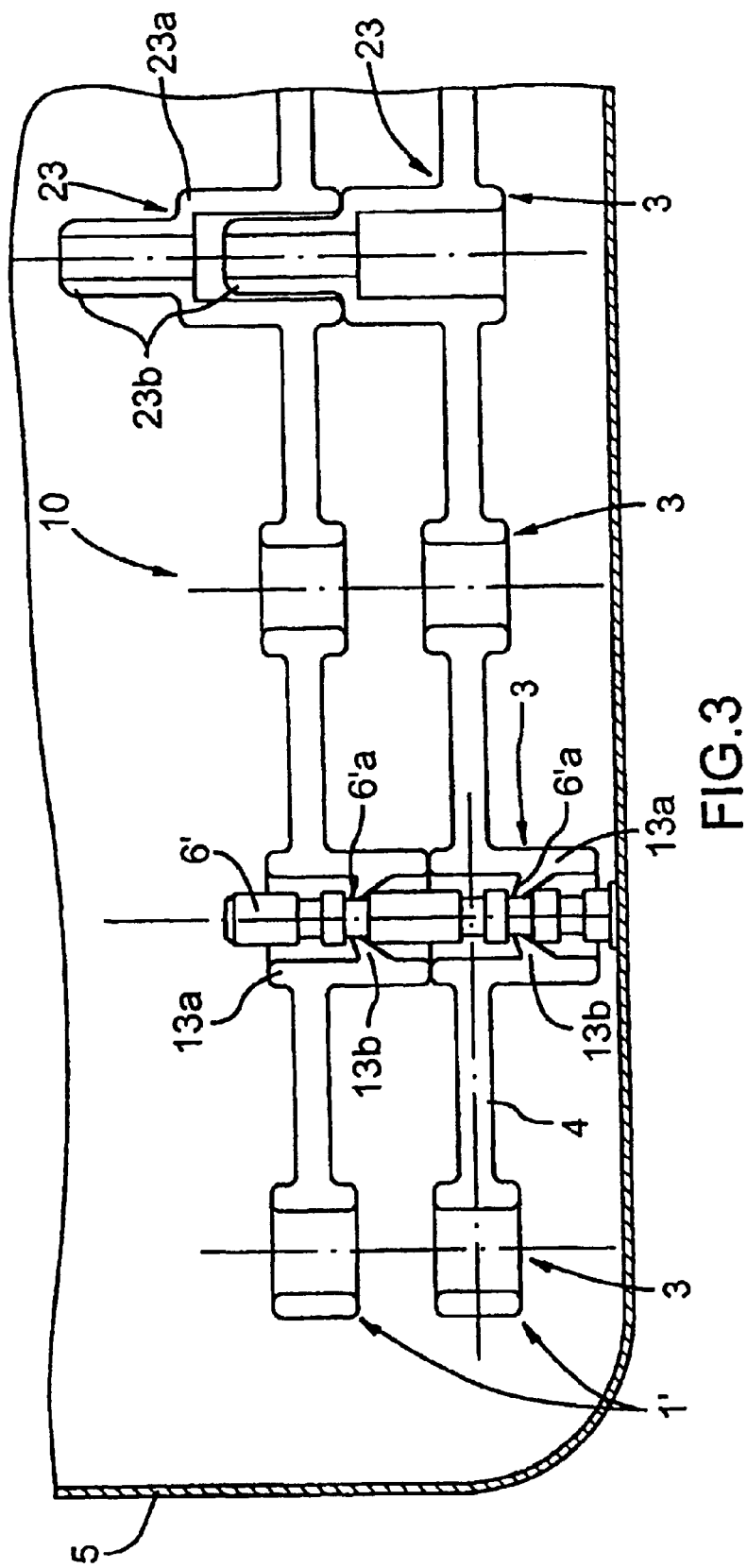
FIG. 3 is a sectional view similar to FIG. 2 of an alternative embodiment of a dampener assembly according to this invention.

Referring to FIG. 3, an alternative embodiment of a dampener assembly according to this invention is shown generally at 10'. The dampener assembly 10' is similar to the dampener assembly 10 except that the dampener assembly 10' includes a plurality of dampener elements 1' attached to each other in a stacked arrangement rather than including a single dampener element 1 as with the dampener assembly 10.

As shown in FIG. 3, two or more dampener elements 1' are attached to the tank 5 by means of attachment studs 6' that extend from the tank bottom wall 5 and are longer than the studs 6 shown in FIG. 2. The attachment of two dampener elements 1' by means of studs 6' occurs in a simple manner in that both dampener elements 1' are equipped with tank connectors 13 in corresponding areas. Each of the tank connectors 13 of the dampener elements 1' are formed as sleeves 13a equipped with locking wedges 13b. Attachment studs 6' are equipped with locking grooves 6'a in at least two areas. Alternatively, a separate lengthening of attachment studs 6 may occur, for example by screwing or plugging together studs with an appropriate design. As FIG. 3 shows, the positions of the locking wedges 13b and of the locking grooves 6'a are such that sleeve 13a of the upper dampener element 1' preferably sits on or engages the sleeve 13a of the corresponding lower adjoining dampener element 1'.

Adjoining dampener elements 1' may be connected to each other by modifying predetermined corresponding junction points 3 of the adjoining dampener elements 1' in the form of interconnecting connection sockets 23. Each connection socket 23 has the form of a two-stage sleeve 23. Specifically, each connection socket 23 has a hollow-sleeve-shaped base 23a and a sleeve-shaped connector 23b extending from the base 23a. The connector 23b of a dampener element 1' positioned beneath an adjoining dampener element 1' is disposed or received in the corresponding base 23a of the adjoining dampener element 1'. The lower end of the base 23a of the dampener element 1' located above the corresponding adjoining dampener element 1' rest on the upper end or shoulder of the corresponding base 23a so as to ensure that base elements 2 of the adjoining dampener elements 1' are properly spaced. The inner diameter of the base 23a may be greater than the outer diameter of the connector 23b such that the connection sockets 23 function in a manner to assist in aligning adjoining dampener elements 1' when connecting adjoining dampener elements 1'. Alternatively, the inner diameter of the base 23a may be approximately equal to or slightly less than the outer diameter of the connector 23b such that the connection sockets 23 not only operate as locators but also assist in maintaining the attachment between adjoining dampener elements 1' by providing a press-fit attachment between corresponding connection sockets 23. Alternatively, the connection sockets 23 may be outfitted with locking wedges and locking grooves similar to the locking wedges 13b and the locking grooves 6a associated with the sleeves 13 and the studs 6, respectively, for providing a locking connection between adjoining dampener elements 1'. It should be appreciated that by providing a press-fit or locking connection between adjoining dampener elements 1', the stud 6 shown in FIG. 2 may be used in place of the stud 6' shown in FIG. 3. More than two layers of dampener elements 1' can be stacked on top of each other inside the tank 5 by means of longer attachment studs and/or by corresponding connector sockets 23.

As discussed above, the lattice or mesh structure of the dampener elements 1, 1' need not be limited to the shapes as illustrated. The shape of base elements 2 may be a triangular shape or a shape with more than four corners, such as a regular or irregular hexagon. Furthermore, the chosen polygons for the dampener element do not all have to be the same size or have the same shape. A lattice or network with a completely irregular design may be utilized. Neither is it necessary for the connection bars 4 to be straight; they can also have a bow shape or other type of curvature. The outer contour of the lattice or network may also be designed to adjust to the contours of the tank.

In a further embodiment, a dampener element may be designed as a simple lattice or mesh consisting of connection bars without specially designed junction points. In this case, the dampener element may be attached above the floor of the tank by means of clips. Clips can also be used to plug together several layers of such simply designed meshes.

Furthermore, it is preferable that dampener assemblies 10, 10' cover a large surface area of the fluid surface of a given tank 5, as well as, be generally parallel to the fluid surface level. Depending on the design of the tank, it may be desirable that the dampener assembly 10, 10' be attached in different areas or parts of the tank.

Additionally, several dampener elements 1, 1' of varying sizes may be located inside the tank 5.

The dampener elements 1, 1' can be manufactured simply and cost-effectively from a fuel-resistant and elastic material, such as high-density polyethylene or a similar plastic, in particular by injection molding.

I claim:

1. A fluid tank assembly for a motor vehicle, comprising:

a tank having an inner surface defining a cavity for receiving a liquid substance;

two or more dampener elements disposed within said tank with one of said dampener elements attached to a bottom portion of said inner surface, each of said dampener elements having a network structure permeable to fluid flow and oriented generally parallel to a liquid surface defined by the liquid substance and each of said dampener elements adjoining another of said dampener elements in a stacked relationship;

each of said dampener elements further includes a plurality of adjoining base elements, each of said base elements including a plurality of connection bars having opposite ends with each of said ends connected to and extending from a junction point such that each of said base elements forms a four-sided closed structure polygon that is permeable to fluid flow, wherein a plurality of said junction points have an annular shape with a central aperture each interconnected by at least two connection bars to form said plurality of base elements;

each of said dampener elements includes a connection socket, said connection sockets of adjoining dampener elements interfacing with each other so as to align and attach said adjoining dampener elements together within said tank;

a stud extending from said inner surface of said tank and a tank connector defining one of said junction points and having a sleeve supported by said dampener element and fastened to said stud whereby said dampener element is attached to said tank; and wherein one of said sleeve and said stud includes a locking wedge extending therefrom and the other of said sleeve and said stud includes a locking groove formed thereon complementary to said locking wedge, said locking wedge being disposed in said locking groove so as to interlock said sleeve and said stud.

2. A fluid tank assembly according to claim 1, wherein said dampener element is formed from a fuel-resistant and elastic material.

3. A fluid tank assembly according to claim 2, wherein said dampener element is formed from a high-density polyethylene.

* * * * *